Sept. 1, 1959    W. W. DOLLISON    2,902,046
BALANCED PILOT VALVE
Filed Nov. 15, 1957
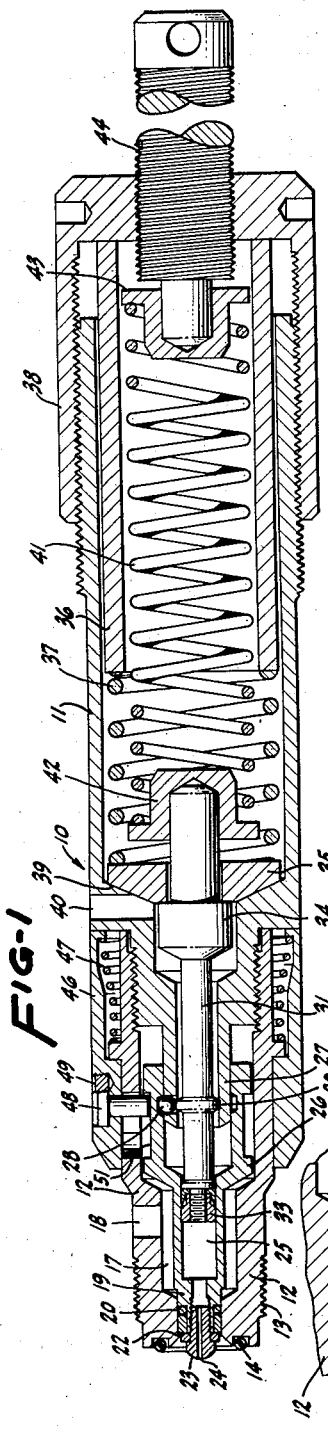
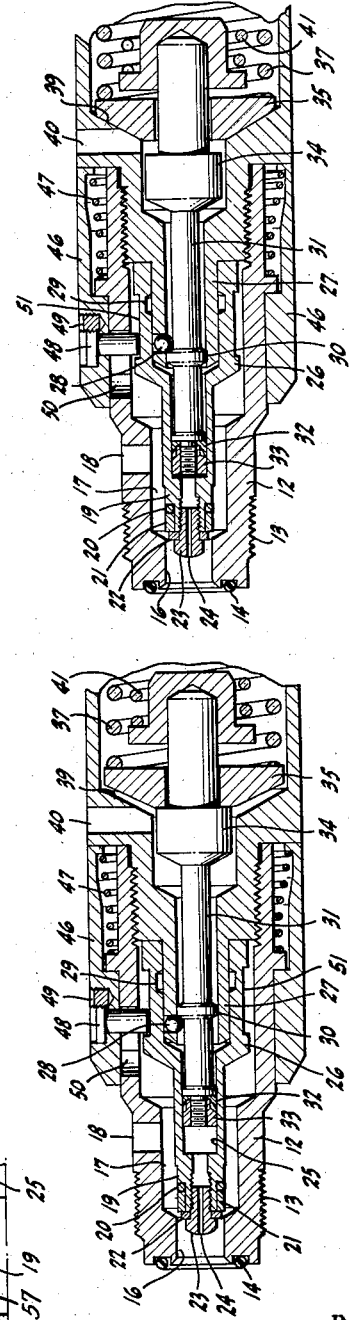
INVENTOR.
WILLIAM W. DOLLISON
BY
Mellin and Hanscom
ATTORNEYS United States Patent Office 2,902,046
Patented Sept. 1, 1959

2,902,046

BALANCED PILOT VALVE

William W. Dollison, Dallas, Tex., assignor to Otis Engineering Corporation, Dallas, Tex., a corporation of Texas Application November 15, 1957, Serial No. 696,708

7 Claims. (Cl. 137—467)

The invention relates to balanced valves, and more particularly to pilot valves adapted to control a chamber filled with fluid under pressure in which the pilot valve will remain closed when the fluid pressure is within a predetermined range, and in which the pilot valve will open to vent the chamber upon the presence of a pressure in the chamber greater or less than the predetermined range.

Many control valves have been designed to control fluid flow through a conduit, in such manner that the flow be automatically terminated if the pressure of the fluid being controlled falls below a predetermined minimum amount or if the pressure rises above a predetermined maximum amount. One such valve is that disclosed in U.S. Patent No. 2,566,772, entitled "Safety Control Valve" and issued to H. C. Otis. In this control valve, the desired control is obtained by venting a control chamber of the control valve by two normally closed pilot valves, one of which is opened upon the presence of a low pressure and the other of which is opened upon a presence of a high pressure, so that if either pilot valve opens, the control chamber is vented to atmosphere and the control valve closes. The two pilot valves are independently adjusted so that the maximum and minimum pressures, at which the control valve will close, can be regulated as desired. It is a primary object of this invention to provide a single pilot valve which may be used to vent such a control chamber, and which will be closed when the pressures in the control chamber are within an allowable range, which will open whenever the pressures in the control chamber become greater or less than the allowable range, and in which the high and low values of the allowable range may be easily and independently adjusted.

It is a further object of this invention to provide a pilot valve adjusted to control a fluid under pressure in which the closure member of the valve is moved to open position by the controlled fluid, in which a means is provided to releasably lock the closure member in closed position, and in which the locking means is released upon a predetermined maximum or minimum pressure of the controlled fluid.

It is a further object to provide a valve having an O-ring seal on the closure member in which the O-ring is prevented from being blown off upon opening movement of the closure member.

Still another object is to provide a pressure-responsive mechanism for shifting the closure member of a valve in response to a control pressure wherein the valve is opened with a snap action upon the control pressure reaching a critical predetermined control pressure limit.

Yet another object is to provide a pressure-responsive mechanism for shifting the closure member of a valve in which the position of the mechanism may be visually determined from the exterior of the valve.

Still another object of the invention is to provide a valve operator adapted to be acted upon by a fluid under pressure and having a balanced position when said fluid is within a predetermined pressure range and in which said operator is moved from said balanced position when the fluid pressure is greater or less than said range.

Other objects and advantages will become apparent in the course of the following detailed description.

In the drawings, forming a part of this application, and in which like parts are designated by like reference numerals throughout the same, Fig. 1 is a sectional view of a balanced valve constructed in accordance with the invention.

Fig. 2 is a partial view of Fig. 1 illustrating the opening of the valve in response to an over-pressure condition.

Fig. 3 is a view similar to Fig. 2 illustrating the opening of the valve in response to an under-pressure condition.

Fig. 4 is an enlarged view of a portion of Fig. 1 showing the details of the construction of the valve closure member.

Referring now to the drawings, wherein is shown, for purposes of illustration, a preferred embodiment of the device, the balanced valve, designated generally by the reference numeral 10, comprises a generally cylindrical housing member 11 threadedly connected to a valve body 12. The latter element is threaded at 13 for connection to a control chamber of a control valve (not shown) containing fluid under pressure, and O-ring 14 is adapted to provide a seal between the valve body and such control chamber.

A flow passage is formed through the valve body 12 and comprises a cylindrical valve seat 16, the internal chamber 17 and the discharge port 18. A valve member 19 slidably fits within the valve seat 16, and is provided with a sealing O-ring 20, and an O-ring retaining member 21. A retaining screw 23 and washer 22 retain the O-ring and O-ring retainer in place on valve member 19.

A restricted passageway 24 is formed through the retaining screw 23 to provide fluid communication with the chamber 25 formed internally of valve member 19. The valve member 19 is provided with a rearwardly extending skirt 26 which slidably embraces an annular flange 27 formed on the housing member 11. Flange 27 has a plurality of openings therethrough to receive a plurality of locking balls 28 therein, the balls having a diameter greater than the thickness of flange 27, so that they will project into the annular groove 29 formed on the interior of skirt 26.

As shown in Fig. 1, the locking balls 28 are normally held in locking position, such that they project into groove 29, by an external flange 30 formed on plunger 31. The left end of plunger 31 extends into chamber 25 of the valve member 19 and is slidably sealed with respect thereto by sealing element 32 held in place by retaining nut 33.

Plunger 31 is radially enlarged at 34 to provide a shoulder thereon engageable with the annular spring guide member 35 loosely mounted for longitudinal movement on plunger 31. A compression spring 37 is confined between spring guide 35 and spring guide 36, the latter element being forced by the spring against the adjustment cap 38 which is threadedly engaged with the housing member 11. Spring 37 normally holds spring guide 35 in engagement with a complementary sloping annular face 39 formed within housing member 11, and resists movement of this spring guide toward the right, away from the annular face.

An observation port 40, formed through housing member 11 and intersecting the sloping face 39, makes it possible to see whether the spring guide 35 is in engagement with either or both of the annular face 39 and the plunger shoulder 34.

A second compression spring 41 is confined between a spring guide 42, mounted on the end of plunger 31, and a spring guide 43, mounted on the end of adjustment screw 44, the latter being threaded through adjustment cap 38.

Preferably, the threaded engagement between the adjustment cap 38 and housing member 11 is of the same pitch and number of threads per inch as that between the adjustment cap 38 and adjustment screw 44, so that either adjustment member may be rotated while the other is held against rotation in order that the compression of springs 37 and 41 may be independently varied. That is, if adjustment screw 44 is held against rotation, the adjustment cap 38 may be threaded onto or off of the housing member 11 to vary the compression of spring 37, without affecting the compression of spring 41. Similarly, if the adjustment cap 38 is held against rotation, the adjustment screw can be threaded into or out of the adjustment cap 38 to vary the compression of spring 41 without affecting the compression of spring 37.

The low pressure spring 41 constantly urges plunger 31 towards the left from the balance position shown in Fig. 1, while movement of the plunger towards the right from the balance position is opposed by both the low pressure spring 41 and the high pressure spring 37. If a force is exerted on plunger 31 tending to move the plunger to the right, the plunger will remain in the balance position as long as such force is greater than the force exerted by the low pressure spring 41 and is less than the force exerted by both the high and low pressure springs 37 and 41. This range of forces in which the plunger will remain in balance position is easily adjusted by adjusting the compression of the springs 37 and 41.

In operation, the valve body 12 is threaded into a fluid filled chamber, and such fluid is allowed to pass through the passage 24 into the interior 25 of the valve member 19 to exert a pressure on the end of plunger 31, urging this member towards the right. As long as the pressure being controlled is within the balance range determined by springs 37 and 41, the plunger will remain in the balance position illustrated in Fig. 1, and the plunger flange 30 will hold the locking balls 28 so that they project into the groove 29, thus locking the valve member 19 against movement.

If the pressure controlled by the valve increases sufficiently to overcome the opposing forces exerted by springs 37 and 41, the plunger 31 will move to the right, as illustrated in Fig. 2. The plunger flange 30 will move from adjacent the locking balls 28, allowing them to move from within the groove 29, to free the valve member 19 for movement. Since the internal diameter of chamber 25 is less than the diameter of the valve seat 16, the fluid controlled by the valve will force the valve member 19 to the right, thus allowing the fluid to vent through the valve.

If the pressure controlled by the valve decreases sufficiently, the low pressure spring 41 will move plunger 31 to the left from the balance position, as illustrated in Fig. 3. Again, the locking balls 28 are free to move from the groove 29 so that the force of the controlled fluid will move the valve member 19 from engagement with the valve seat 16.

It will be noted that the valve member cannot be subjected to any chattering action as the critical pressure limits are reached and as the valve opens. For any pressure within the allowable pressure range, the valve member will be positively locked into closed position by the engagement of the plunger flange 30 with the locking balls. The valve member will remain locked, as the critical pressures are approached, until the locking balls are finally released by the movement of the plunger flange 30, at which time the valve member becomes unlocked and is free to move unrestrainedly to open position.

Once opened, the valve member 19 will remain in open position, but may be reset in the following manner. A reset sleeve 46 surrounds the valve body 12 and is normally biased to the right by spring 47. Pin 48, mounted on sleeve 46 and held in place thereon by setscrew 49, projects through a J-slot 50 in valve body 12 and extends into a circumferential groove 51 formed on the skirt 26 of valve member 19. If the valve member 19 is in open position, as in Figs. 2 or 3, the valve member may be closed by moving the reset sleeve 46 to the left, causing the pin 48 to engage the left side of groove 51 to move the valve member to the left until the groove 29 therein is positioned adjacent the locking balls 28. The valve member may be manually locked in this position by rotating the reset sleeve 46 to move pin 48 into the curved part of J-slot 50, if desired.

The observation port 40 provides an indication of operating conditions and also enables one to tell whether the opening of the valve member was as a result of a high or low pressure condition. With the valve member 19 closed, and with a fluid pressure within the balance range, the spring guide 35 will be seen in engagement with the plunger shoulder 34 and housing member face 39. If the valve member has been unseated due to a high pressure condition, the plunger 31 will have moved to the left, as in Fig. 2, allowing the valve member to open. However, the plunger 31 can not move back to its balance position because the plunger flange 30 will engage the locking balls 28, and the plunger will then be locked in the position of Fig. 2 until the device is reset. Consequently, upon looking through port 40, if the spring guide 35 is unseated from face 39, it will indicate that a high pressure condition had existed to open the valve. Similarly, if the plunger shoulder 34 is seen as unseated from spring guide 35, as in Fig. 3, it will indicate that the valve had been opened as a result of a low pressure condition.

In the operation of the valve, the valve member 19 must be withdrawn from the valve seat 16 when a high differential pressure exists across the O-ring seal 20. To prevent this O-ring from being blown off of the valve member, the opposed faces of valve member 19 and O-ring retainer 21 are each formed with annular grooves 56 and 57 to receive the O-ring 20 thereinto, so as to lap over the O-ring to afford a mechanical hold on the O-ring. In addition, the void area underneath the O-ring is held to a minimum to limit stored pressure energy therein.

The outside diameter of the valve member 19 and the inside diameter of the O-ring retainer 21 are held dimensionally close to prevent fluid from passing therebetween and from entering into the area beneath the O-ring, which would tend to force the O-ring from its proper position. Also, the outside diameter of the O-ring retainer and the inside diameter of the valve seat 16 are held dimensionally close in order to provide a partial seal or piston fit. Prior to opening, the entire pressure differential across the valve exists across the O-ring 20. When the valve member begins to withdraw from the valve seat 16, the O-ring will no longer seal against the valve seat, and the O-ring retainer will then withstand the pressure differential as a partial seal until it, too, is withdrawn from the valve seat. In this manner, the pressure energy available at the exposed face of the O-ring is limited, and the exhausting fluid will not act to blow the O-ring off of the valve member.

It is to be understood that the form of the invention herewith shown and described is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. A valve of the character described comprising a valve body having a fluid flow passage therethrough and a valve seat in said flow passage, a valve closure member adapted to sealingly engage said valve seat and movable therefrom by fluid pressure upstream of said valve seat, means to releasably lock said closure member in sealing engagement with said valve seat, a plunger chamber, a reciprocably slidable plunger in said chamber, said plunger having an intermediate balance position relative to said plunger chamber, conduit means communicating said chamber with said flow passage upstream of said valve seat whereby fluid pressure upstream of said valve seat will urge said plunger to move in a first direction, first biasing means operable to oppose movement of said plunger from said balance position in said first direction, second biasing means to urge said plunger to move from said balance position in a direction opposite to said first direction, means responsive to movement of said plunger in either direction from said balance position to release said locking means, and means to independently vary the bias exerted by said first and second biasing means.

2. A valve of the character described comprising a valve body having a fluid flow passage therethrough and a valve seat in said flow passage, a valve closure member adapted to sealingly engage said valve seat and movable therefrom by fluid pressure upstream of said valve seat, means to releasably lock said closure member in sealing engagement with said valve seat, a plunger chamber, a reciprocably slidable plunger in said chamber, said plunger having an intermediate balance position relative to said plunger chamber, conduit means communicating said chamber with said flow passage upstream of said valve seat whereby fluid pressure upstream of said valve seat will urge said plunger to move in a first direction, first biasing means operable to oppose movement of said plunger from said balance position in said first direction, second biasing means to urge said plunger to move from said balance position in a direction opposite to said first direction, and means responsive to movement of said plunger in either direction from said balance position to release said locking means.

3. A valve comprising a valve body having a flow passage therethrough and a valve seat in said flow passage, a valve closure member adapted to sealingly engage said valve seat and to be moved therefrom by pressure upstream thereof, means to releasably lock said closure member in sealing engagement with said valve seat, a piston chamber, a reciprocably slidable plunger in said chamber and having an intermediate balance position therein, conduit means communicating said chamber with said passage upstream of said valve seat whereby pressure upstream of said valve seat urges said plunger to move in a first direction, first spring means opposing movement of said plunger in said first direction from said balance position, second spring means biasing said plunger to move from said balance position in a direction opposite to said first direction, and means responsive to movement of said plunger in either direction from said balance position to release said locking means.

4. A balanced valve comprising a valve body having a flow passage therethrough and a cylindrical valve seat in said passage, a valve closure member slidably fitting wthin said valve seat in sealing engagement therewith and adapted to be moved downstream therefrom to open said passage, said closure member having a plunger chamber formed axially therein and a passage communicating said chamber with said flow passage upstream of said valve seat, a plunger axially slidable within said chamber and movable in one direction by the fluid pressure upstream of said valve seat, a locking ball carried by said valve body, said closure member having a ball-receiving recess therein positioned adjacent said locking ball when said closure member is in sealing engagement with said valve seat, said plunger having a member thereon engageable with said locking ball to hold said locking ball in said recess when said plunger is in an intermediate balance position with respect to said valve body, a first spring means to oppose movement of said plunger in said one direction from said balance position, and a second spring means to urge said plunger in a direction from said balance position opposite to said one direction.

5. A balanced valve comprising a valve body having a flow passage therethrough and a cylindrical valve seat in said passage, a valve closure member slidably fitting within said valve seat in sealing engagement therewith and adapted to be moved downstream therefrom to open said passage, said closure member having a plunger chamber formed axially therein and a passage communicating said chamber with said flow passage upstream of said valve seat, a plunger axially slidable within said chamber and movable in one direction by the fluid pressure upstream of said valve seat, a locking ball carried by said valve body, said closure member having a ball-receiving recess therein positioned adjacent said locking wall when said closure member is in sealing engagement with said valve seat, said plunger having a member thereon engageable with said locking ball to hold said locking ball in said recess when said plunger is in an intermediate balance position with respect to said valve body, a first spring means to oppose movement of said plunger in said one direction from said balance position, a second spring means to urge said plunger in a direction from said balance position opposite to said one direction, and means to independently adjust the forces exerted by said first and second spring means on said plunger when the latter is in said balance position.

6. A balanced valve operator comprising first and second members movable relative to one another and having a fixed intermediate balance position therebetween, first biasing means to oppose movement of said first member in a first direction from said balance position, means to prevent movement of said first member by said first biasing means in a second direction from said balance position opposite to said first direction, and second biasing means to oppose movement of said first member in said first direction from said balance position and to urge said first member to move in said second direction from said balance position.

7. A valve body having a flow passage provided with a cylindrical valve seat therein, a cylindrical valve closure member adapted to be slidingly received within said valve seat and having an end position of reduced diameter, an O-ring carried on said reduced diameter portion of said closure member, an elongated annular O-ring retainer carried on said reduced diameter portion of said closure member, said O-ring retainer having an external diameter approximately equal to the diameter of said valve seat and an internal diameter approximately equal to the reduced diameter portion of said closure member, said closure member and said O-ring retainer having opposed faces provided with annular grooves therein to receive said O-ring thereinto so as to lip over said O-ring to mechanically grip said O-ring and to eliminate void spaces thereunder, means to releasably lock said closure member in sealing engagement with said valve seat, and means responsive to predetermined maximum and minimum pressures upstream of said valve seat to release said locking means, whereby said upstream pressures will move said valve closure member to open position.

References Cited in the file of this patent

UNITED STATES PATENTS

| 907,103 | Bowman | Dec. 15, 1908 |
| 2,704,650 | Rand | Mar. 22, 1955 |
| 2,733,729 | Wolf | Feb. 7, 1956 |

FOREIGN PATENTS

| 731,863 | Great Britain | June 15, 1955 |